United States Patent [19]

Warren

[11] Patent Number: 4,777,767

[45] Date of Patent: Oct. 18, 1988

[54] GUIDE FOR ATTACHING A WINDOW OF AN AUTOMOTIVE VEHICLE TO A GUIDE CHANNEL

[75] Inventor: James R. Warren, Lincoln Park, Mich.

[73] Assignee: General Motors Corporation, Detroit, Mich.

[21] Appl. No.: 90,129

[22] Filed: Aug. 27, 1987

[51] Int. Cl.⁴ ............................................. E05F 11/38
[52] U.S. Cl. ...................................... 49/374; 49/428
[58] Field of Search .................. 16/90, 93 R; 49/348, 49/349, 350, 352, 459, 428, 374, 437, 436, 440, 442

[56] References Cited

U.S. PATENT DOCUMENTS

| 2,912,288 | 11/1959 | Griswold. | |
|---|---|---|---|
| 3,466,802 | 9/1969 | Doveinis et al. | 49/428 |
| 3,466,803 | 9/1969 | Packett | 49/374 |
| 4,069,617 | 1/1978 | Koike | 49/374 |
| 4,483,100 | 11/1984 | Blankenburg et al. | 49/374 |
| 4,503,639 | 3/1985 | Rossie et al. | 49/374 |
| 4,593,494 | 6/1986 | Ono et al. | 49/374 |

Primary Examiner—Kenneth J. Dorner
Assistant Examiner—Gerald A. Anderson
Attorney, Agent, or Firm—William A. Schuetz

[57] ABSTRACT

A guide for guiding the movement of an automotive window along a channel shaped track is disclosed. The guide is made from two molded, identical plastic half members which are snap fittingly connected together and which have track receiving head portions which are held apart by bowed leafs and biasingly held via integral hinges in sliding engagement with the track when connected therewith to eliminate or minimize rattling noise therebetween.

10 Claims, 2 Drawing Sheets

GUIDE FOR ATTACHING A WINDOW OF AN AUTOMOTIVE VEHICLE TO A GUIDE CHANNEL

The present invention relates to a guide for attaching a movable element, such as a window of an automotive vehicle, to a channel shaped stationary guide track and, more particularly, to a two-headed guide comprised of two molded plastic half members which are shaped and arranged such that they can be snap fittingly connected together and such that their heads are automatically deflected and retained in a position away from each other in channel receiving positions when connected together.

Heretofore, various guide arrangements have been used for guiding a window of an automotive vehicle between open and closed positions. One kind of guide arrangement employs a guide which is secured to the window and has a head or roller means at its end remote from the window which is rollably or slidably received within a stationary channel shaped guide track carried by a door or other body structure of the vehicle. Examples of such guide arrangements are shown in U.S. Pat. Nos. 4,483,100; 4,503,639 and 4,593,494. These known arrangements, however, require that the guide and associated track be manufactured with relatively close tolerances and they have a tendency to cause rattling between the guide and the track. It is also known to employ a guide roller which is received within a channel shaped guide track which is made from two nylon disk parts which are biased apart by a spring washer to maintain the roller in engagement with the track to take up tolerance variations and to minimize rattling therebetween. Such a guide arrangement is shown in U.S. Pat. No. 2,912,288 and is assigned to the same assignee as the present invention.

The present invention provides a novel guide which is made from two molded, identical, plastic half members which are snap fittingly connected together and which have track receiving head portions which are held apart and biasingly held in sliding engagement with the channel shaped track when connected therewith. This guide is not sensitive to manufacturing tolerance variations in the window, guide or track and it eliminates or minimizes any rattling noise between the guide and the track.

Accordingly, it is a broad object of the present invention to provide a new and improved guide for guiding an element, such as a window of an automotive vehicle in opposite directions between closed and open positions, along a stationary guide track, and in which the guide comprises two molded, identical, plastic half-members which are snap fittingly connected together and which have track receiving head portions which are held apart and biasing held within sliding engagement with the channel shaped track when connected therewith and in which the guide is of a relatively simple and economical construction, is not sensitive to manufacturing tolerance variations in window guide or track and which eliminates or minimizes any rattling noise between the guide and the track when connected thereto.

A further object of the present invention is to provide a new and improved guide, as defined in the next preceding object, and wherein each half member of the guide includes a base portion which is adapted to be connected with the window, a shank portion integral with the base portion and which extends perpendicularly thereto, a head portion which is adapted to be received in the channel shaped track and which is aligned with the shank portion in the as-molded condition, a neck portion integrally hinged via hinge means to the shank portion and the head portion, a bowed leaf integral at its opposite ends with the shank portion and the head portion and bridging said neck portion, as viewed in elevation, and cooperable means on the shank portion of the half members for snap fittingly connecting the shank portions of the half members together after the base, shank and head portions are aligned back to back, and wherein the bowed leafs engage each other as the half members are connected together and cause the hinge means at the neck portions thereof to deflect and move the head portions away from each other from their aligned as-molded position to position the same so that their free ends face in directions generally away from each other and so that the head portions have their central axes extending transversely of the longitudinal axis of the guide.

Yet another object of the present invention is to provide a new and improved guide, as defined in the penultimate object, and in which each half member of the guide comprises a generally planar base portion which is adapted to abut and be connected with the window, a shank portion integral with the base portion and which extends perpendicularly thereto and has a planar back, a circular head portion which is adapted to be received in the channel shaped track, a neck portion integrally hinged at one end via a first hinge means to the shank portion and integrally hinged at its other end via a second hinge means to the head portion, a bowed leaf integral at its opposite ends with the shank portion and the head portion and bridging the neck portion, as viewed in elevation, and cooperable means on the shank portions of the half members for snap fittingly connecting the shank portions and the half members together after their base, shank and head portions are aligned back to back, and wherein the bowed leafs engage each other as the half members are connected together and cause the first and second hinge means to pivot in opposition to their self-biasing forces and move the neck and head portions away from each other to position the head portions so that their free ends face away from each other and with the first and second hinge means being further pivotable in opposition to their self-biasing forces when the head portions are received in the guide track and with the self-biasing forces functioning to maintain the head portions in engagement with the track when connected thereto to prevent rattling therebetween.

A still further object of the present invention is to provide a new and improved guide, as defined in the next preceding object, and in which the base and shank portions includes integral reinforcing ribs so as to provide rigid base and shank portions and wherein the head and neck portions have substantially rigid reinforcing ribs which are engageable with each other to limit the extent to which the hinge means can be pivoted and whereby the hinge means in effect pretension the head portions so that they are at all times biasingly engaged with the channel shaped track when connected thereto.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which.

Figure 2:
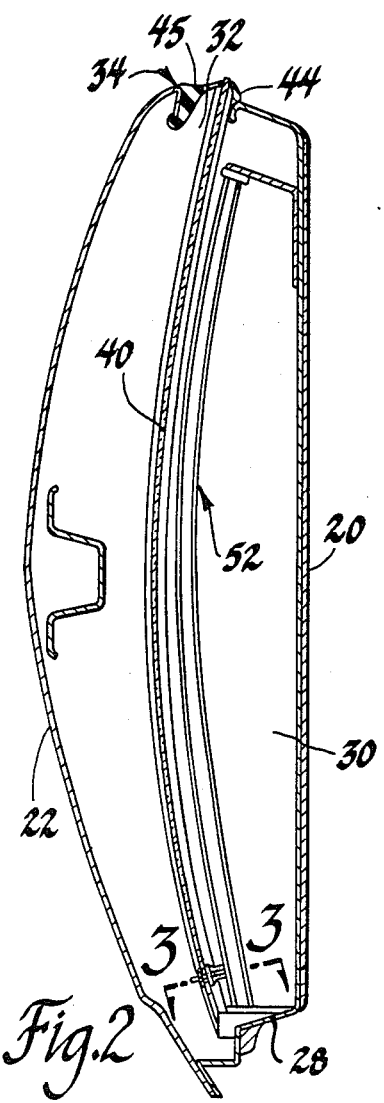
FIG. 2 is a cross sectional view of the vehicle door assembly and taken along the lines 2—2 of FIG. 1, but showing the window in its open position.
Figure 4:
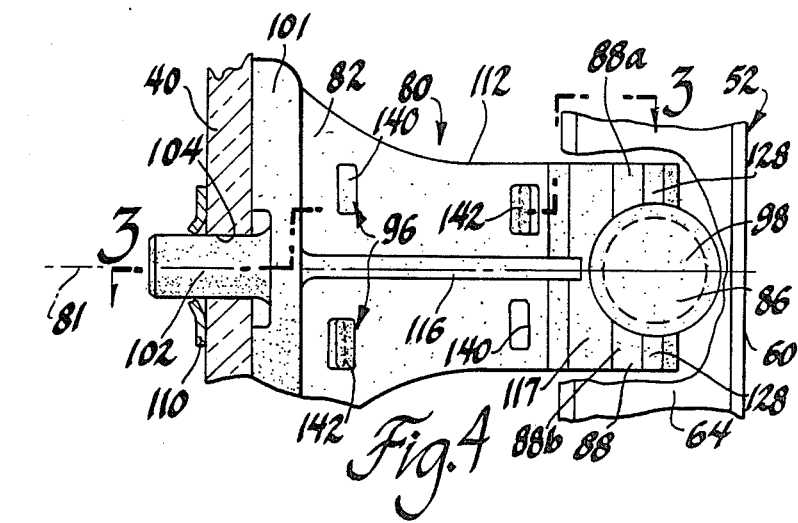
Figure 3:
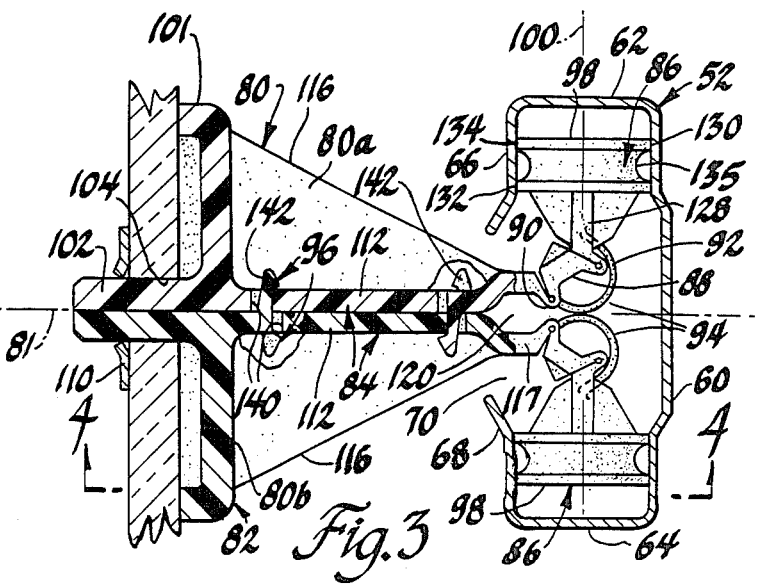
Figure 5:
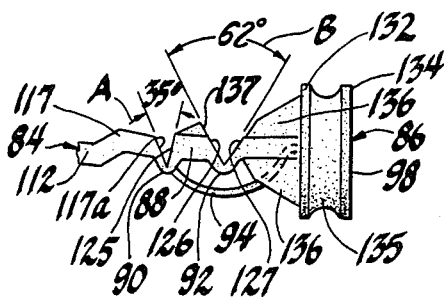
Figure 6:
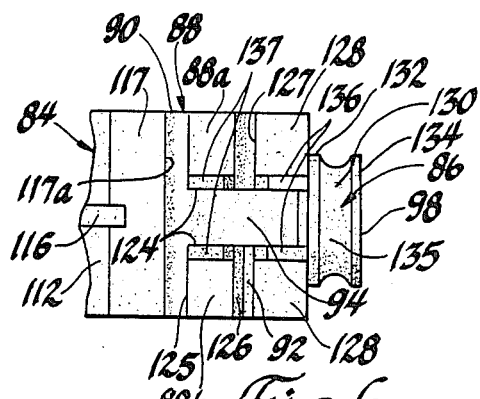
Figure 7:
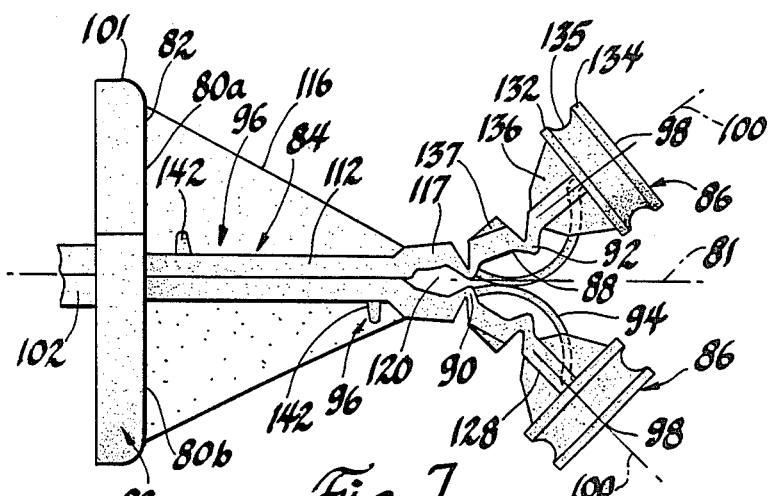
Figure 8:
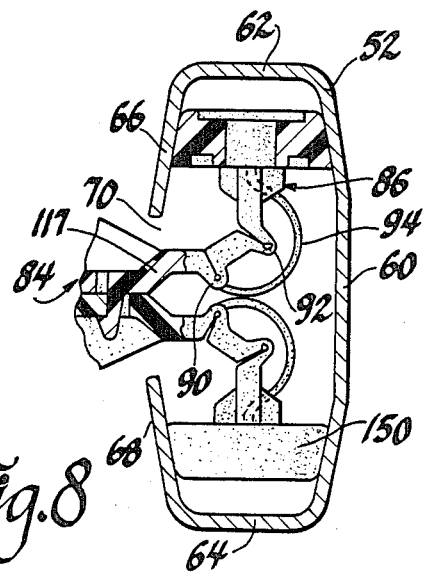

FIG. is an enlarged fragmentary sectional view of a preferred embodiment of the novel guide of the present invention and taken along the lines 3—3 of FIG. 2;

FIG. 4 is a side elevational view with parts broken away of the guide shown in FIG. 3 and looking in the direction of the arrows 4—4 of FIG. 3;

FIG. 5 is an enlarged fragmentary top elevational view of part of the guide shown in FIG. 3, and showing the position of the same in its as-molded condition;

FIG. 6 is a fragmentary side elevational view of that part of the guide shown in FIG. 5 and looking in the direction of the arrows 6—6 of FIG. 5;

FIG. 7 is a view like that shown in FIG. 3, but showing the level guide prior to its attachment to the guide track; and FIG. 8 is a fragmentary top plan view with parts shown in section, of an alternative embodiment of the novel guide of the present invention.

Figure 1:
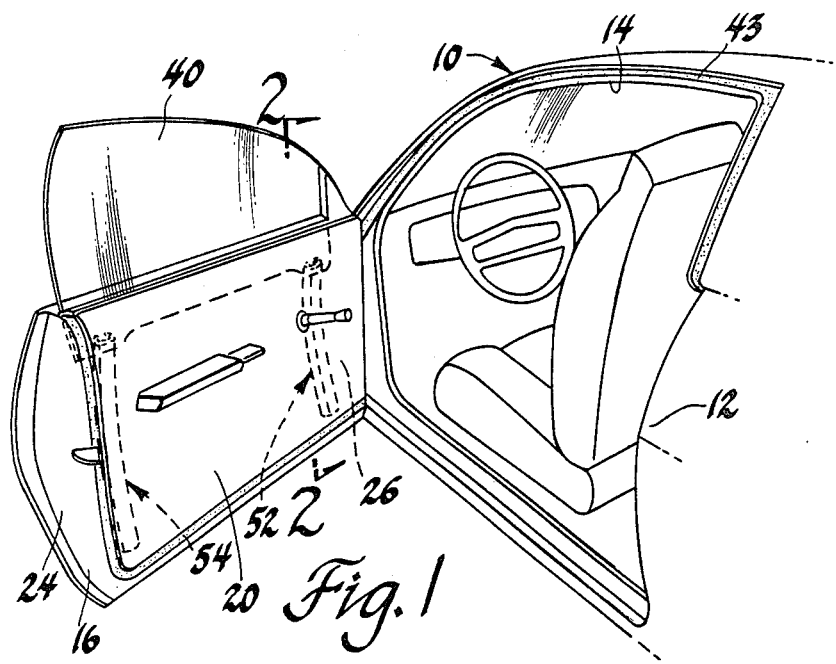
FIG. 1 is a fragmentary perspective view of an automotive vehicle showing its door assembly with its window thereof in its closed position and embodying the novel guide of the present invention.

Referring to FIG. 1 of the drawings, an automotive vehicle 10 is thereshown. The vehicle 10 includes body structure 12 which defines a door opening 14. The vehicle 10 also includes a door assembly 16 which is adapted to be hinged at its front end to the vehicle body structure 12 via suitable hinges (not shown) for movement between an open position, as shown in FIG. 1, and a closed position in which it closes off the body side opening 14.

The door assembly 16 can be of any suitable or convention construction and includes an inner door panel 20, an outer door panel 22, a rear end wall 24, a front or forward end wall 26, and a bottom wall 28 which together define a well 30 having an elongated opening 32 along its top or belt line 34 of the vehicle 10. The door assembly 16 further includes an unframed window 40 which is supported for movement therein between a closed position, as shown in FIG. 1, in which most of the window 40 is disposed above the belt line 34 of the vehicle and an open position, as shown in FIG. 2, in which the window 40 is received within the well 30 of the door assembly 16. The window 40 is unframed in that its side and top edges are not slidably received within an inverted U-shaped frame and the window when in its closed position, as shown in FIG. 1, respectively engages a suitable seal 43 carried by the body structure 12 around the upper portion of the opening 14 and suitable seals 44 and 45 carried by the inner and outer door panels 20 and 22 of the vehicle body structure 12 to provide a seal between the window 40 and the body structure 12.

The window 40 is supported for movement between its open and closed positions by a suitable guide arrangement 50. Guide arrangement 50 comprises fore and aft guide tracks 52 and 54 which are stationarily secured via brackets to the inner panel 20 of the door assembly 16. The guide tracks 52 and 54 are curved so as to have the same radius of curvature as the window 40. The guide tracks 52 and 54 are of identical construction and therefore only the guide track 52 will be described in detail.

As best shown in FIG. 3, the guide track 52 is generally C-shaped and includes a bottom wall 60 adjacent the inner door panel 20, a pair of end walls 62 and 64 and a pair of forward walls 66 and 68 integral with the end walls 62 and 64, respectively. The forward wall 66 and 68 terminate at locations spaced from each other so as to define an elongated opening 70 extending the entire length of the guide track 52 and which faces towards the plane of the window 40.

In accordance with the provisions of the present invention, a novel guide or guide means 80 is provided for attaching the window 40 to the guide channels 52 and 54. The guides 80 are suitably secured to the window 40 adjacent its lower end at its fore and aft sides and are slidably received within the guide channels 52 and 54.

The novel guides 80 of the present invention comprise two molded, identically shaped, plastic, half members 80a and 80b which are snap fittingly connected together to provide a guide 80 symmetrical about its longitudinal axis 81. Since the guide half members 80a and 80b are of an identical construction, the same reference numerals will be employed to designate corresponding parts thereof, but only the guide half member 80a will be described in detail.

The guide member 80a comprises, in general, a base portion 82 which is adapted to abut and be connected with the window 40, a shank portion 84 integral with the base portion 82 and which extends perpendicularly thereof, a circular head portion 86 which is adapted to be received within the channel shaped track 52, a neck portion 88 which is integrally hinged at one end via a first hinge means 90 to the shank portion 84 and integrally hinged at its other end via a second hinge means 92 to the head portion 86, a bowed leaf 94 integral at its opposite ends with the shank portion 84 and the head portion 86 and which bridges over the neck portion 88, as viewed in elevation, and cooperable means 96 on the shank portion 84 of the half members 80a and 80b for snap fittingly connecting the shank portions 84 and half members 80a and 80b together after their base, shank and head portions 82, 84 and 86 are aligned back to back. The first and second hinge means 90 and 92 are self-biased toward a normal, as-molded, free state position so that the neck and head portions 88 and 86 are longitudinally aligned with the shank portion 84, as best shown in FIG. 5. When the cooperable means 96 of the half members 80a and 80b are connected together, the bowed leafs 94 thereof engage each other and cause the first and second hinge means 90 and 92 to pivot in opposition to their self biasing forces and move the neck and head portions 88 and 86 away from each other to the position shown in FIG. 7 in which the head portions 86 have their free ends 98 facing away from each other and the head portions 86 have their central axes 100 extending transversely of the longitudinal axis 81 of the guide 80, the axes 100 forming an acute included angle with the longitudinal axis 81.

It should be noted at this point that the first and second hinge means 90 and 92 are further pivotable in opposition to their self-biasing forces from their position shown in FIG. 7 after the half members 80a and 80b are connected together so that the head portions 86 can be disposed opposite each other and be received within the guide track 52 and with their self-biasing forces functioning to maintain the head portions 86 in engagement with the track 52 when connected thereto, as shown in FIG. 3.

The base portion 82 of the half member 80a is a generally planar member semi-circular in shape. As best shown in FIGS. 3 and 4, the base member 82 includes a semi-circular shaped rim 101 extending rearwardly thereof which is adapted to engage the window 40. The base 82 also includes a rearwardly extending pin 102 which is semi-circular in shape, as viewed in cross section, and which is adapted to extend through an opening 104 in the window 40 when connected thereto. When the half members 80a and 80b are connected together, the pins 102 thereof are aligned back to back thereof and together define a circularly shaped pin which extends through the opening 40 in the window and together define a circularly shaped base and rim which abuttingly engages the window on its side facing the track 52. The guide 80 is held secured to the window by a suitable fastener means, such as a push on spring clip 110 which is force fitted over the pins 102 and engages the window 40 on the side opposite the base portions 82 so as to retain the guide member 80 securely to the window 40.

The shank portion 84 is integral with base portions 82 and extends perpendicularly thereto. The shank portion 84 comprises a planar back 112 having a width equal to the diameter of the semi-circularly shaped base 82 at its rearward or left end, as viewed in FIGS. 3 and 4, and is of a lesser width at its forward end, as best shown in FIG. 4. The back 112 is integral with the base 102 along its chordal diameter. The shank portion 84 also includes a reinforcing rib 116 which extends perpendicularly with respect to the back 112. The reinforcing rib 116 is generally triangularly shaped and has its left end, as viewed in FIGS. 3 and 4, integral with the base portion 82 and its lower side, as best viewed in FIG. 3, integral with the back 112. The construction of the shank portion 84 is such that it is a rigid support member.

The shank portions 84 of the half members 80a and 80b at their forward or right ends 117, as viewed in FIG. 3, extend away from the plane of their respective backs 112 and diverge away from each other to define a space 120 therebetween, and for a reason to be hereinafter more fully apparent.

The neck portion 88 of the half member 80a comprises a pair of spaced neck sections 88a and 88b which are of a rigid construction. The spaced sections 88a and 88b define an open space 124 therebetween. Each of the neck sections 88a and 88b are integrally connected with the forward end 117 of the back 112 of the shank portion 84 via first integral hinge means 90. The hinge means 90 are flexible or pivotable. As best shown in FIG. 5, the forward ends 117 of the back 112 have an end face 117a and the rearward end of the neck sections 88a and 88b have end faces 125 which are beveled and define therebetween an acute included angle A which is approximately 35°. The neck sections 88a and 88b are also integrally hinged to the rearward ends of the head portions 86 via second hinge means 92. The hinge means 92 are also flexible or pivotable and the neck sections 88a and 88b of the neck portion 88 have forward end faces 126 and the head portion has rearward ends or end faces 127 which are beveled and define therebetween and an acute included angle B of approximately 60°-65°, preferably 62°.

The head portions 86 comprise a pair of spaced planar rearward sections 128 whose rearward ends 127 are integral with the second hinge means 92 and a forward end section 130 in the shape of a wheel rim 130. That is, the forward end section or wheel rim 130 has a pair of spaced circular flanges 132 and 134 which are integrally connected via an intermediate hub portion 135 of a lesser diameter. The rearward section 128 is integral with the flange 132. The head portion 86 also includes a pair of spaced reinforcing ribs 136 integral with the rearward sections 128 adjacent the slot 124 and integral with the flange portion 132. The configuration and construction of the head portion 86 is such that it is a rigid plastic member. The reinforcing ribs 136 extend normal to the plane of the rearward sections and are aligned with reinforcing ribs 137 on the neck portion 88, as best shown in FIG. 6. The reinforcing ribs 137 on the neck portion also extend perpendicular thereto and have beveled forward ends which are adapted to be engaged by beveled rearward ends on the reinforcing ribs 136 on the head sections 128, and for reasons to be hereinafter more fully described.

The bowed leaf 94 is located between the neck sections 88a and 88b of the neck portion 88 and the rearward sections 128 of the head portion 96. The bowed leaf 94 has one end integral with the forward end 117 of the shank portion 84 and its other end integral with the head portion 86 at the juncture of the rearward sections 128 and the flange 132 thereof. The length of the bowed leaf 94 is greater than the distance between the first hinge means 90 and the flange 132 of the head portion 86. The bowed leaf 94 thus bridges over the neck portion 88, as viewed in side elevation in FIG. 5, and at its forward most end extends between the reinforcing ribs 136 on the head portions 86. The bowed leaf 94 is substantially rigid, although it may deflect or flex somewhat.

The cooperable means 96 for snap fittingly connecting the two half members 80a and 80b together comprises a pair of rectangular apertures 140 extending through the back 112 of the shank portion 84 of each half member 80a, 80b at diagonally opposite locations on opposite sides of the reinforcing rib 116 and a pair of integrally formed headed protrusions 142 extending perpendicularly to the plane of the back 112 at opposite locations on opposite sides of the reinforcing rib 116. Thus, as best shown in FIG. 4, there is one opening 140 and one protrusion 142 adjacent the rearward or left and forward or right ends of the shank portion 84 of each half member 80a, 80b.

It should be noted at this point that when the guide half members 80a and 80b are in the as-molded condition, that the hinge means 90 and 92 thereof are self-biased toward a normal free state position in which the shank portions 84, neck portions 88 and head portions 86 are longitudinally aligned, as shown in FIG. 5. When the two half members 80a and 80b are connected together, they are aligned with each other back to back so that the base portions 82, shank portions 84 and head portions 86 are longitudinally aligned. They are connected together by press fitting back portions 112 towards each other after the protrusions 142 on the half member 80a are aligned with the apertures 140 of the half member 80b and the protrusions 142 on the half member 80b are aligned with the apertures 140 on the half member 80a. When the shank portions 84 are press together, the headed protrusions 142 will be received within the respective apertures 140 of the other half member and be deflected from their normal free state position by the side wall of the back portion 112 defining the apertures 140 until the heads of the protrusions 142 clear the apertures 140. When this occurs, the protrusions 142 will return toward their normal free state position and hook behind the outer surface of the back member 112 of the other half member 80a or 80b. The two half members 80a and 80b are thus snap fittingly connected together and are securely retained together by the cooperable means 96.

When the two half members 80a and 80b are connected together, the bowed leaves 94 on the respective members 80a, 80b will engage one another. Since the bowed members 94 are substantially rigid, although some flexure or deflection may take place, they cause the first and second hinge means 90 and 92, which are much more flexible, to pivot and move the neck portions 88 and the head portions 86 away from one another to the position shown in FIG. 7. When in this position, the respective end faces 98 of the head portions 86 face away from each other and have their central axes 100 extending transversely of the longitudinal axis 81 of the guide 80.

When the head portions 86 are deflected to the position shown in FIG. 7, as the result of the half members 80a and 80b being connected together, further pivotal movement of the head members 86 is permitted. This is because in this position the beveled sides 117 and 125 and 126 and 127 adjacent the hinge means 90 and 92, respectively, are still slightly spaced from one another. The reason for this is so that when the head portions 86 are inserted within the guide channels 52, 54 it is necessary to further pivotally move the head portions 86 away from each other to enable them to be inserted therein. This further pivotal movement is permitted in opposition to the self-biasing forces of the first and second hinge means 90 and 92 and ensures that when the head portions 86 are inserted in the guide channel 52, 54 that the hinge means 90 and 92, due to their self-biasing forces, will biasingly hold the head portions 86 in engagement with the guide channel 52, 54.

It should also be noted that the hinge means 90 and 92 enable the head portions 86 to be pivoted about their central axis 100 slightly greater than 90°. If pivoted much beyond that extent, the beveled sides 117, 125 and 126, 127 on the shank neck and head portions 84, 88 and 86, respectively, along with the beveled sides of the reinforcing ribs 136 and 138 on the neck portion 88 and the head portion 86, respectively, will engage one another to limit the extent to which the head portions 86 can be pivoted relative to the shank portions 84 so as to prevent over pivoting and/or breakage of the hinge means 90 and 92. The hinge means 90 and 92, when pivoted from their normal free state position, as shown in FIG. 5, thus function, in effect, as a pretension means for the head portions 86 when they are received within the guide channel 52, 54 to biasingly retain the same against the bottom wall 60 of the guide channel 52 so as to prevent rattling between the guide member 80 and the guide channel 52 or 54. In addition, the provision of the bowed leaf member 94 serve to provide equal or substantially equal stress on the hinge means 90, 92 of the half members 80 and 80a and serve to prevent axial flexing between the head portions 86 when the half members 80a and 80b are connected together. Also, it should be noted that the provision of the spaced flanges 130 and 132 minimizes the amount of frictional contact between the head portions 86 and the bottom 60 wall of the guide track 52 or 54.

FIG. 8 shows an alternative embodiment of the present invention. If a roller is desired in place of the flanged wheel rim head portion 86, the wheel rim could be replaced by an axially extending shank to which a suitable roller 150 could be mounted if rolling contact between the guide channel 52 rather than sliding contact with the guide channel were desired.

From the foregoing, it should be apparent that a novel guide has been provided which is of a relatively simple and economical construction, is not sensitive to manufacturing tolerance variations in the guide track, the guide or the window and which prevents rattling between the guide and the guide track has been provided. In addition, the concept of providing a pair of identically shaped half members which are snap fittingly retained together and which include bowed leaf portions for prepositioning head portions in a position to be receivable in the guide channel makes for easy and quick assembly.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A guide for guiding the movement of an element, such as a window of an automotive vehicle, in opposite directions along a channel-shaped stationary track and in which the guide at one end thereof is adapted to be secured to the element so as to extend transversely of its direction of movement and at its other end is received within the channel-shaped track, the improvement being that said guide comprises two molded, plastic half-members which are snap fittingly connected together to provide a guide symmetrical about its longitudinal axis, each of said half members comprising:
   a. a base portion which is adapted to be connected with said element;
   b. a shank portion integral with said base portion and which extends perpendicularly thereof;
   c. a head portion which is adapted to be received in said channel shaped track and which is aligned with said shank portion in the as-molded condition;
   d. a neck portion integrally hinged via hinge means to said shank portion and said head portion;
   e. a bowed leaf integral at its opposite ends with said shank portion and said head portion and bridging said neck portion; and
   f. cooperable means on said shank portion of said half members for snap fittingly connecting said shank portions of the half members together with their base, shank and head portions aligned back to back;
   said bowed leafs engaging each other as the half members are connected together and causing said hinge means and neck portions thereof to deflect and move said head portions away from each other and from their aligned as molded condition to position the head portion so that their free ends face in directions away from each other and so that the head portions have their central axes extending transversely of said longitudinal axis of said guide.

2. A guide for guiding the movement of a closure element, such as a window of an automotive vehicle, in opposite directions along a channel-shaped stationary track and in which the guide at one end thereof is adapted to be secured to the element so as to extend transversely of its direction of movement and at its other end is slidably received within the channel-shaped track, the improvement being that said guide comprises two molded, plastic half-members which are snap fittingly connected together to provide a guide symmetrical about its longitudinal axis, each of said half members comprising:

a. a generally planar base portion which is adapted to abut and be connected with said closure element;

b. a shank portion integral with said base portion and which extends perpendicularly thereof and has a generally planar back;

c. a circular head portion which is adapted to be received in said channel shaped track;

d. a neck portion integrally hinged at one end via a first hinge means to said shank portion and integrally hinged at its other end via a second hinge means to said head portion;

e. a bowed leaf integral at its opposite ends with said shank portion and said head portion and bridging said neck portion, said first and second hinge means being self-biased toward a normal as-molded free state position so that the neck and head portions are longitudinally aligned with said back of said shank portion; and f. cooperable means on said shank portion of said half members for snap fittingly connecting said shank portions of the members together with their base, shank and head portions aligned back to back;

said bowed leafs engaging each other as the half members are connected together and causing said first and second hinge means to pivot in opposition to their self-biasing forces and move said neck and head portions away from each other to position said head portions so that their free ends face away from each other and so that the head portions have their central axes extending transversely of said longitudinal axis of said guide, said first and second hinge means being further pivotable in opposition to their self-biasing forces when said head portions are received in the guide track and with their self-biasing forces functioning to maintain the head portions in engagement with the track when connected thereto.

3. A guide for guiding the movement of a window of an automotive vehicle in opposite directions between open and closed positions along a C-shaped stationary track and in which the guide at one end thereof is adapted to be secured to the window so as to extend transversely of its direction of movement and at its other end is slidably received within the C-shaped track, the improvement being that said guide comprises two molded, plastic half-members which are snap fittingly connected together to provide a guide symmetrical about its longitudinal axis and wherein each of said half members comprises:

a. a semi-circular, generally planar base portion which is adapted to abut against and be connected with said window;

b. a shank portion having a planar back integral with said base portion along its chordal end and which extends perpendicularly thereof, said shank portion also having a reinforcing rib integral with said back and said base portion whereby said shank portion and said base portion are rigid;

c. a head portion including a pair spaced circular flanges which are adapted to be received in said C-shaped track, said head portion having a central axis which is longitudinally aligned with the plane of said back of said shank portion in the as-molded condition;

d. a pair of laterally spaced neck portions between said shank and head portions, said neck portions at one end being integrally hinged via first hinge means to said shank portion and at their other ends portion being integrally hinged via second hinge means, said head portion, said first and second hinge means being self-biased toward a normal as molded free state position so that the neck and head portions are longitudinally aligned with said back of said shank portion;

e. a bowed leaf integral at its opposite ends with said shank portion and said head portion and being located between said laterally spaced neck portions, said leaf having a length greater than the neck portions and bridging over said neck portions; and f. cooperable means on said backs of shank portions of said half members for snap fittingly connected said shank portions and half members together after their backs and cooperable means are aligned back to back;

said bowed leafs of the half members engaging each other as the half members are connected together and causing said first and second hinge means to pivot and move said neck and head portions thereof away from each other to position said head portions so that their free ends face away from each other and so that the head portions have their central axes extending transversely of said longitudinal axis of said guide, said first and second hinge means being further pivotable in opposition to their self-biasing forces when said head portions are received in the guide track and with their self-biasing forces functioning to maintain the head portions in engagement with the track when connected thereto.

4. A guide, as defined in claim 3, and wherein said cooperable means comprises a pair of through apertures at diagonally opposite locations on said back of said shank portion of each half member and a pair of perpendicularly extending headed, deflectable, protrusions integral with said back of said shank portion of each half member at opposite diagonal locations thereon, said protrusions on said back of said shank portions on each half member being snap fittingly received through the apertures in the back of the shank portion of the other half member to connect the same together.

5. A guide, as defined in claim 3, and wherein the first hinge means can be pivoted through an angle of approximately 35° from its as molded condition and wherein the second hinge means can be pivoted through an angle of approximately 60° from its as molded condition.

6. A guide, as defined in claim 2, and wherein said head portions have a separate wheel member attached thereto for engaging the guide track.

7. A guide, as defined in claim 2, and wherein said head portion includes a pair of laterally spaced circular flanges which define a wheel for engaging the guide track.

8. A guide, as defined in claim 3, and wherein said head portions include axially and transversely extending integral reinforcing ribs adjacent said bowed spring located between said second hinge means and the circular flange most adjacent said neck portion 9. A guide, as defined in claim 8, and wherein said neck portions each have a transversely extending reinforcing rib adjacent said bowed spring.

10. A guide, as defined in claim 9, and wherein the reinforcing ribs on said neck portions and the reinforcing ribs on said head portion have adjacent ends which are engageable with each other to limit the extent the first and second pivot means can be pivoted.

* * * * *